United States Patent [19]

Julow et al.

[11] Patent Number: 5,586,625
[45] Date of Patent: Dec. 24, 1996

[54] METHOD FOR FINAL BALANCING A BRAKE DRUM

[75] Inventors: Jay K. Julow, Louisville, Ky.; Robert A. DeRegnaucourt, Centerville; John C. Hall, Kettering, both of Ohio

[73] Assignee: Dayton Walther Corporation, Dayton, Ohio

[21] Appl. No.: 572,227

[22] Filed: Dec. 13, 1995

Related U.S. Application Data

[62] Division of Ser. No. 76,986, Jun. 14, 1993, Pat. No. 5,483,855.

[51] Int. Cl.$^6$ .............................. B23C 3/34; F16D 65/10
[52] U.S. Cl. ......................... 188/218 R; 188/78
[58] Field of Search ..................... 188/78, 325, 218 R, 188/218; 82/1.11, 112, 903; 409/84, 123, 132

[56] References Cited

U.S. PATENT DOCUMENTS 4,986,149  1/1991  Carmel et al. ................... 82/1.11

5,483,855  1/1996  Julow et al. ................... 82/1.11

Primary Examiner—Robert J. Oberleitner
Assistant Examiner—Chris Schwartz
Attorney, Agent, or Firm—MacMillan, Sobanski & Todd

[57] ABSTRACT

An improved method for final balancing the brake drum determines the location and length of a constant depth cut along the squealer band which is necessary to correct the imbalance, and using a cutting machine, makes the constant depth cut at the predetermined location and for the predetermined length along the squealer band to produce a final balanced brake drum. Preferably, the cutting machine is a milling machine which produces a plunge type entrance/exit cut. It is a further feature of the invention to provide a feather type entrance/exit cut to reduce the stress concentrations, and produce a cosmetically more appealing final balanced brake drum.

4 Claims, 3 Drawing Sheets

METHOD FOR FINAL BALANCING A BRAKE DRUM

This is a divisional of application Ser. No. 08/076,986 filed on Jun. 14, 1993, now U.S. Pat. No. 5,483,855.

BACKGROUND OF THE INVENTION

This invention relates in general to brake drums and, in particular, to an improved method for final balancing a brake drum provided with an integral squealer band.

The production of cast metal brake drums for heavy duty vehicles begins with a conventional sand-patterned mold casting operation. After cleaning, the brake drum casting is precision drilled and concentrically machined to predetermined dimensional tolerances. However, at this point, the machined brake drum typically incorporates a sufficient imbalance which renders the brake drum unsatisfactory for use on a vehicle. As a result of this, the brake drum is generally subjected to a "final balancing" operation. Conventionally, this final balancing operation has been achieved by determining the location and amount of the imbalance using a static balancer, and then welding correcting weights to an outer surface of the drum.

Typically, a heavy duty brake drum is provided with an integral raised squealer band. One method which can be used to final balance a brake drum having a squealer band subjects the drum to a final machining operation. According to this method, a static balancer is first used to determine the location and amount of the imbalance. An operator then marks the location of the imbalance on the squealer band, and transfers the marked drum to a milling machine. The milling machine is operated and flattens off an outer surface of the squealer band at the marked imbalance location to produce a final balanced brake drum.

U.S. Pat. No. 4,986,149 to Carmel et al. discloses another method for correcting the imbalance in a brake drum having an integral squealer band by subjecting the drum to a final machining operation. According to the method of this patent, a static balancer is first used to determine the location and amount of the imbalance. Then, a crescent or wedge of material is preferably cut away from an outer surface of a squealer band of the brake drum by a lathe during an eccentric turning process to produce a final balanced brake drum.

SUMMARY OF THE INVENTION

This invention is an improvement on the method of the above discussed U.S. patent to Carmel et al. The improved method for final balancing the brake drum determines the location and length of a constant depth cut along the squealer band which is necessary to correct the imbalance, and using a cutting machine, makes the constant depth cut at the predetermined location and for the predetermined length along the squealer band to produce a final balanced brake drum. Preferably, the cutting machine is a milling machine which produces a plunge type entrance/exit cut. It is a further feature of the invention to provide a feather type entrance/exit cut to reduce the stress concentrations, and produce a cosmetically more appealing final balanced brake drum.

As a result of correcting the imbalance by making a constant depth cut along the squealer band, a greater imbalance in the brake drum can be corrected compared to the prior art.

Other advantages of this invention will become apparent to those skilled in the art from the following detailed description of the preferred embodiment, when read in light of the accompanying drawing.

DETAILED DESCRIPTION OF THE PREFERRED EMBODIMENT

Figure 1:
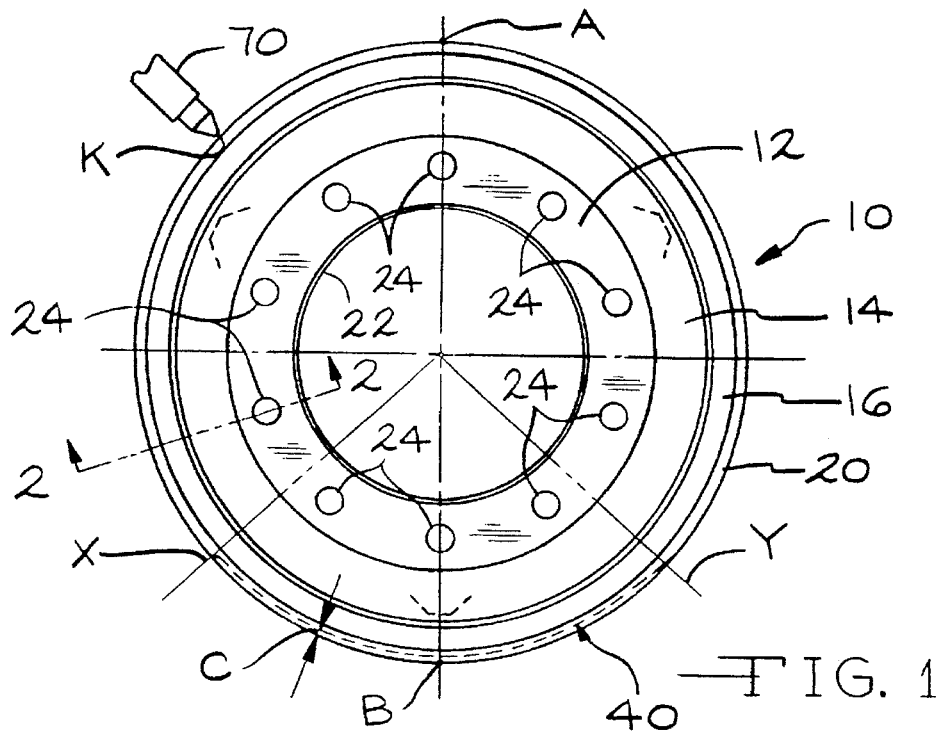
FIG. 1 is a plan view of a final balanced brake drum constructed in accordance with the present invention.
Figure 2:
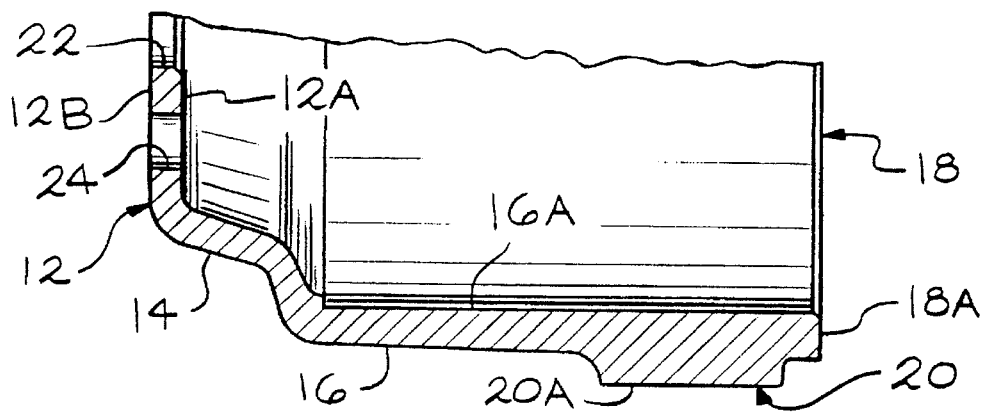
FIG. 2 is a partial cross sectional taken along line 2—2 of FIG. 1.

Referring now to the drawings, there is illustrated in FIG. 1 a brake drum, indicated generally at 10, constructed in accordance with the present invention. As best shown in FIG. 2, the brake drum 10 includes a generally closed end or annular bolt flange 12, a transition section 14, a generally axially extending cylindrical main body 16, and an open end 18. The cylindrical body 16 includes a raised continuously extending annular squealer band 20 having an outwardly facing surface 20A.

The brake drum 10 further includes a generally centrally located spindle receiving opening 22 formed therein, and a plurality of holes 24 (10 holes being shown in this embodiment), drilled through the flange 12 and spaced circumferentially about the opening 22. The holes 24 are adapted to receive wheel mounting studs (not shown). The brake drum 10 is typically cast from grey iron, but can be made from other metals.

Once the brake drum is cast, the outwardly facing surface 20A of the squealer band 20, an inner surface 16A of the cylindrical body 16, an inner surface 12A and an outer surface 12B of the flange 12, and an end surface 18A of the open end 18 are machined to predetermined design dimensions. The brake drum 10 thus far described is conventional in the art.

Turning now to the present invention, the initially machined brake drum 10 typically incorporates a sufficient imbalance such that it cannot be satisfactorily used on a vehicle. This imbalance establishes a light side of the brake drum, and an opposite heavy side. In FIG. 1, the center of the light side is denoted at point A on an outer surface 20A of the squealer band, and the center of the heavy side is denoted at point B on an outer surface 20A of the squealer band 20 and is located 180° from point A. As will be discussed below, in accordance with the present invention, a predetermined amount of material is removed from the heavy side of the squealer band 20, as shown by a dashed line 40 in FIG. 1, to correct the imbalance and produce a final balanced brake drum 10. As shown in FIG. 1, this material is removed along a predetermined angular section of the squealer band 20 generally defined by lines X and Y.

Figure 6:
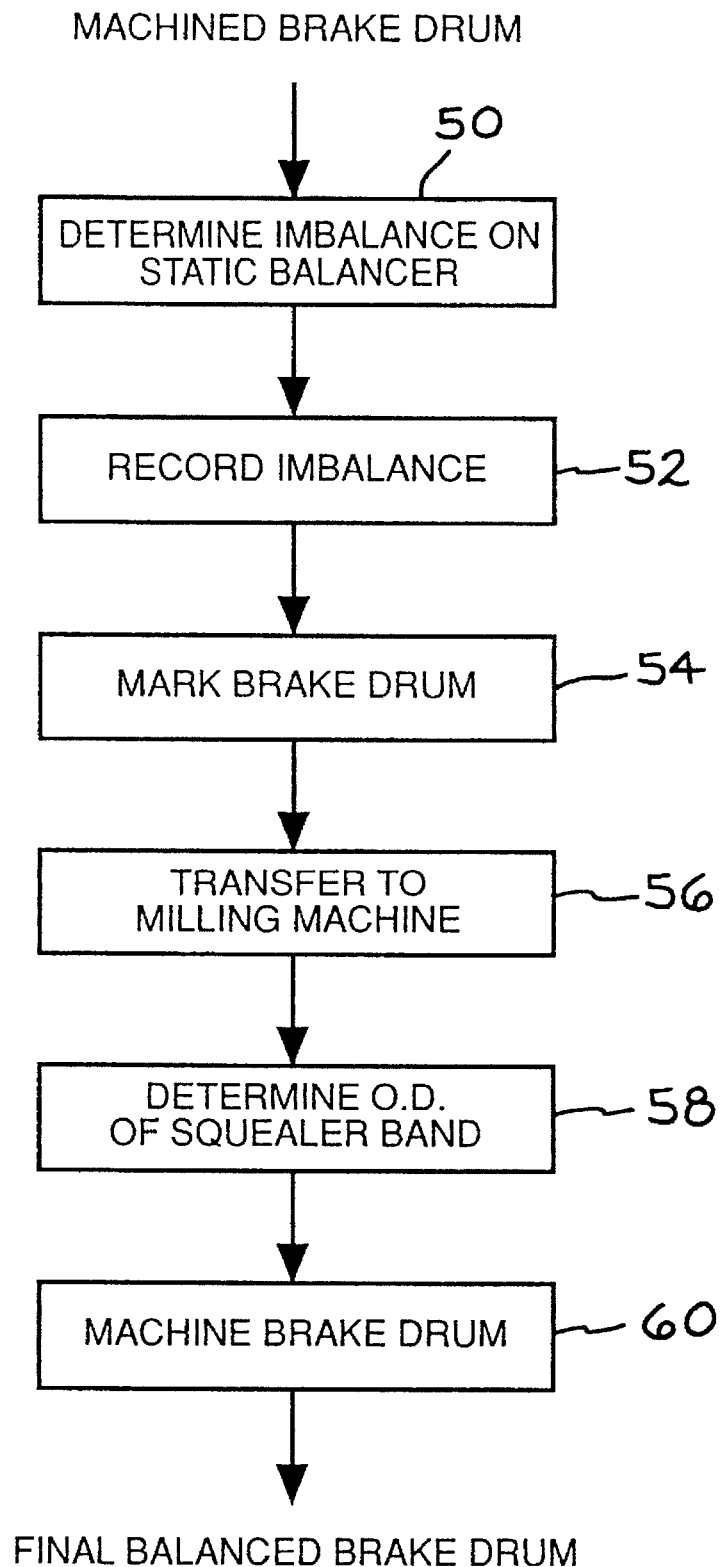
FIG. 6 is a flow diagram illustrating a sequence of steps for producing the brake drum shown in FIG. 1.

Referring now to FIG. 6, a preferred sequence of steps for producing the final balanced brake drum 10 shown in FIG. 1 will be discussed. Initially, in step 50, the initially machined brake drum is positioned and clamped in place on a static balancer (not shown) to determine whether the brake drum has a final balance which is unacceptable. If during step 50 it is determined that the brake drum has an unacceptable imbalance, the angular location of the heavy point of the imbalance (denoted by point B in FIGS. 1 and 3), and the ounce/inch imbalance is recorded relative to a reference mark (denoted by point K in FIG. 1) by a recording device (not shown), such as a computer, which is integrated with the static balancer in step 52.

As will be discussed, the reference mark K is needed in instances where the brake drum is manually transferred from the static balancer to a milling machine (not shown). If the static balancer is incorporated with the milling machine, if the brake drum is manually or automatically transferred to the milling machine without rotating it from the position which it was located on the static balancer, or if a fully automated transfer system includes means for orienting the drum on the milling machine in a predetermined position, the reference mark K may be omitted.

Next, in this embodiment, prior to removing the brake drum from the static balancer, the reference mark K is applied to an outer surface of the brake drum in step 54 by a marking device 70. The marking device 70 is fixed relative to static balancer, and as will be discussed below, the reference mark K applied by the device 70 provides a mark on the brake drum which is later used for positioning purposes when transferring the brake drum to a milling machine. Preferably, the reference mark K is automatically applied to the outer surface of the brake drum by the marking device 70. The marked brake drum is then removed from the static balancer and transferred to the milling machine in step 56.

The milling machine is integrated with the computer which recorded the imbalance location B (relative to reference mark K) and the amount of the ounce/inch imbalance of the brake drum. During step 56, the marked brake drum is positioned and clamped in place with the reference mark K on the drum aligned with a corresponding reference mark (not shown) provided on the milling machine.

Once the brake drum is properly positioned on the milling machine, the brake drum is rotated to a predetermined position calculated by the computer. Next, during step 58, a measuring device (not shown) measures the precise outer diameter of the squealer band 20 near the imbalance point B, and transfers this measurement to the computer. Using the stored data from step 52 and the precise outer diameter of the squealer band of the corresponding brake drum from step 58, the computer determines a constant depth cut and a length thereof along the squealer band which is necessary to correct the measured imbalance of the drum. Finally, in step 60, the milling machine is operated and via a control signal supplied by the computer, removes a predetermined amount of material from an outer surface 20A of the squealer band 20 to produce the final balanced brake drum 10.

Figure 3:
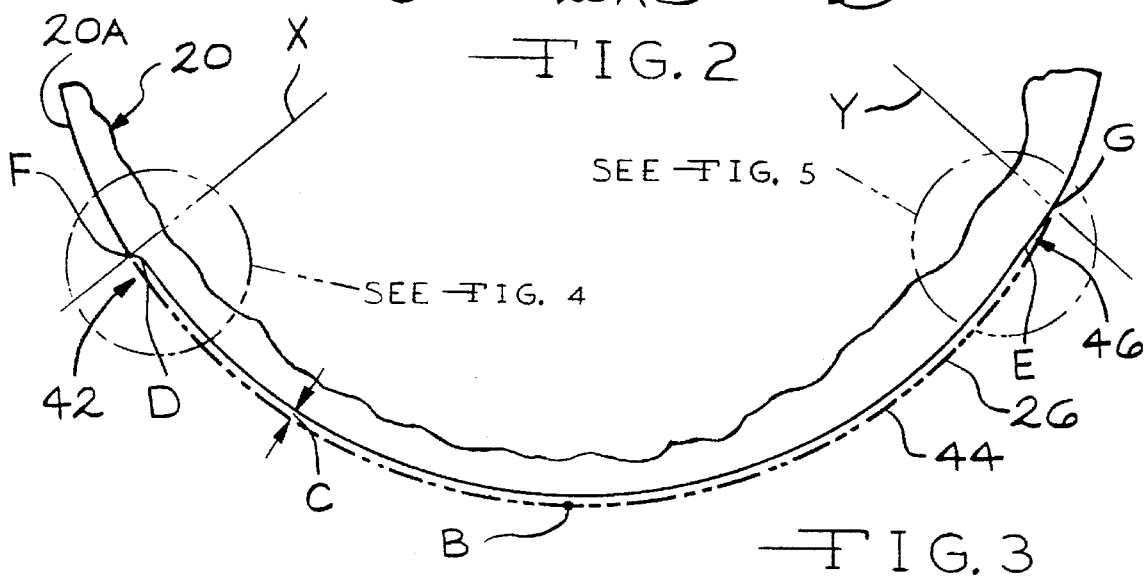
FIG. 3 is an enlarged plan view of a lower portion of the brake drum shown in FIG. 1, and showing a balance cut provided therein.

Turning now to FIG. 3, there is illustrated an enlarged lower portion of the brake drum 10 shown in FIG. 1, having the predetermined amount of material removed from the squealer band 20 by the cut 40 to correct the imbalance. As shown therein, the cut 40 consists of an entrance portion 42, a constant depth arc-shaped sweep cut portion 44, and an exit portion 46.

While both the entrance and exit portions 42 and 46, respectively, used to correct the imbalance of an individual brake drum are the same, for discussion purposes two different ways of forming the entrance and exit portions of the cut 40 are shown in FIG. 3. The entrance cut portion 42, shown more clearly in FIG. 4, defines a plunge type cut. The exit cut portion 46, shown more clearly in FIG. 5, defines a feather type cut.

The generally constant depth cut 44 made in the outer surface 20A of the squealer band 20 extends from a point D to a point E. Also, in FIG. 3, the original contour of the imbalanced brake drum squealer band prior to the cut 40 being made therein is represented by a dashed line 26.

Figure 4:
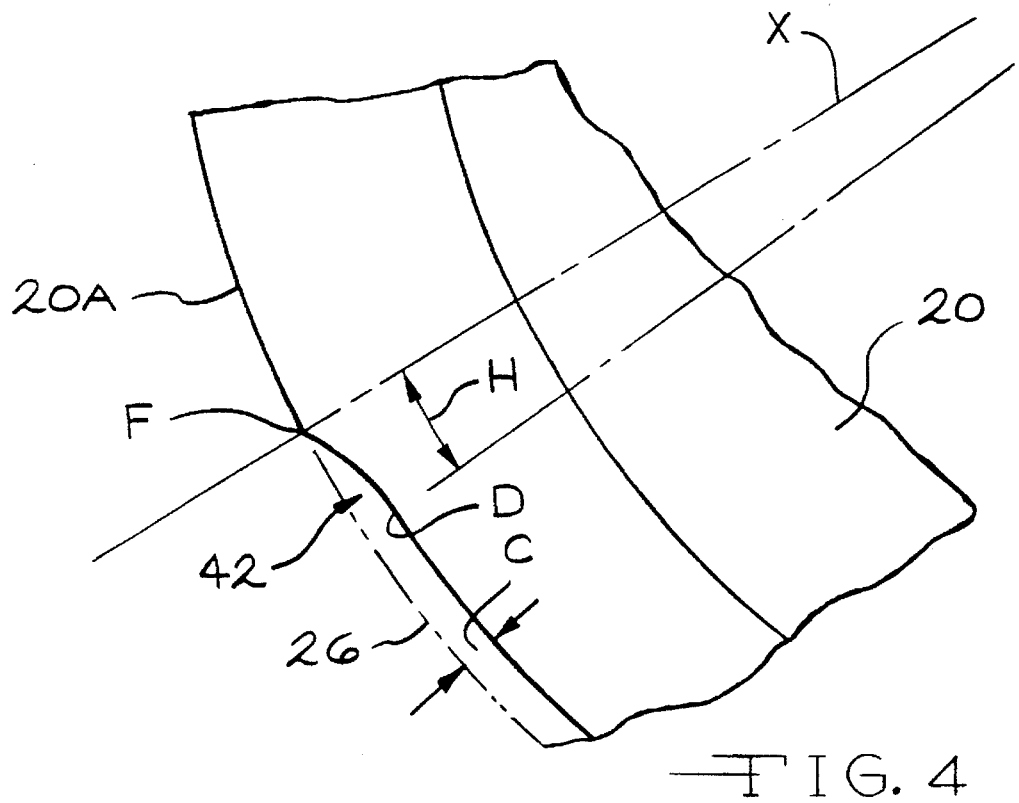
FIG. 4 is a enlarged detailed view of a left hand portion of FIG. 3, and illustrating one version of an entrance/exit cut.

Turning now to FIG. 4, the plunge type entrance cut made by the milling machine during step 60 extends into the outer surface 20A of the squealer band 20 starting at a point F, and continues into the surface 20A of the squealer band 20 until a predetermined full depth dimension C is reached at point D. Once the full depth dimension C is reached, the milling machine is operative to make the constant depth arc-shaped sweep cut along the squealer band 20 for a predetermined length defined between points D and E. At point E, an exit cut, shown in FIG. 5 as being the preferred feather type cut, is made from the constant depth cut at point E to the outer surface 20A of the squealer band at a point G. For comparison purposes, a plunge type exit cut (from point E to F) is shown in FIG. 5 by a dashed line 48.

Figure 5:
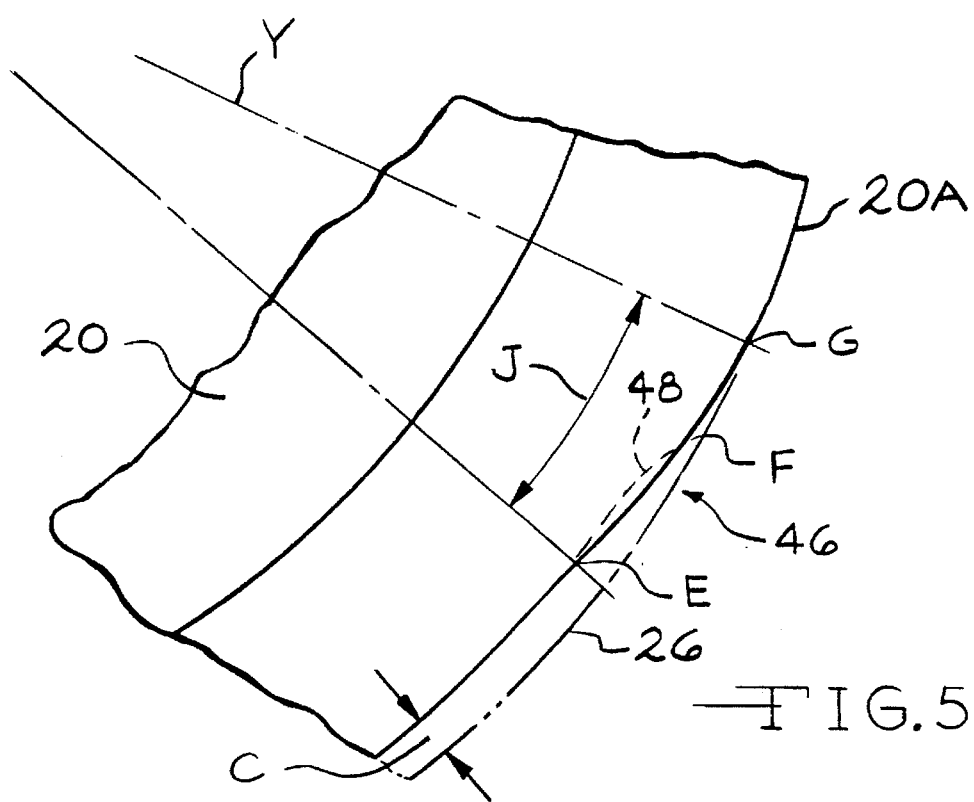
FIG. 5 is a enlarged detailed view of a right hand portion of FIG. 3, and illustrating an alternate and preferred version of the entrance/exit cut.

Comparing the plunge type cut from points F to D shown in FIG. 4 to the feather type cut from points E to G shown in FIG. 5, the plunge cut reaches the full depth dimension C in an angle H, and the feather cut reaches the same full depth dimension C in an angle J which is greater than the angle H. As a result of this, it is apparent that the start of the feather cut at point G into the outer surface 20A of the squealer band 20 occurs before the start of the plunge cut at point F into the squealer band outer surface 20A. Regardless of the particular type of entrance and exit cuts which are used, the beginning and ending points for the constant depth cut defined by points D and E, are located generally equidistant relative to point B.

As discussed above, the entrance and exit cuts are preferably feather type cuts rather than plunge type cuts. The feather type cuts provide a smooth transition down to the constant depth cut and back to the outer surface of the brake drum as compared to the plunge type cuts. As a result of this, the feather type cuts reduce the stress concentrations formed in the final balanced brake as compared to the plunge type cuts. Also, the smooth transition of the feather type cuts results in a better looking final balanced brake drum as compared to the plunge type cuts.

The preferred feather type entrance and exit cuts are at a constant slope rate of approximately 0.005 inches per degree of rotation of the brake drum until the predetermined constant depth C is reached. In addition, regardless of the type of entrance and exit cuts which are made by the milling machine, the preferred maximum dimension of the constant depth cut C is approximately 0.060 inches, and the preferred length of the constant depth cut is calculated using a maximum angle between points D and E of approximately 120°. However, since all of these figures depend upon the particular amount of imbalance which needs to be corrected, and the particular diameter of the corresponding brake drum (relative to the machined inner diameter), the actual figures necessary to correct the imbalance can be different from those discussed above.

One advantage of the present invention is that the constant depth cut 44 from points D to E can correct a greater imbalance in the brake drum in a shorter length along the squealer band 20 compared to the prior art balance methods. Also, the cycle time to final balance a brake drum according to the present invention is substantially less compared to the cycle time of the prior art balance methods.

In accordance with the provisions of the patent statutes, the principle and mode of operation of this invention have been described and illustrated in its preferred embodiment. However, it must be understood that take invention may be practiced otherwise than as specifically explained and illustrated without departing from its spirit or scope.

What is claimed:

1. A final balanced brake drum comprising a generally cylindrical body provided with an integral raised squealer band, said squealer band having an outwardly facing surface initially machined to a predetermined diameter around its entire circumference, said brake drum having the initially machined squealer band incorporating an unacceptable imbalance, said squealer band being further machined to produce a cut at a predetermined location along said squealer band, said cut having a circumferentially extending substantially constant depth which extends along a predetermined length of said squealer band, with said predetermined location, depth, and length being selected to produce a brake drum which corrects the imbalance.

2. The brake drum defined in claim 1 wherein said constant depth cut includes a feathered entrance cut at one end of said constant depth cut, and a feathered exit cut at an opposite end of said constant depth cut.

3. The brake drum defined in claim 1 wherein said constant depth cut includes a plunge entrance cut at one end of said constant depth cut, and a plunge exit cut at an opposite end of said constant depth cut.

4. The brake drum defined in claim 1 wherein said cut extends substantially across the entire width of said squealer band.

* * * * *